United States Patent Office 2,730,511
Patented Jan. 10, 1956

2,730,511

PHENOL-FORMALDEHYDE RESINS ESTERIFIED WITH HIGHER UNSATURATED FATTY ACIDS AND DIMERIZED ROSIN

Don E. Floyd, Robbinsdale, Minn., assignor to General Mills, Inc., a corporation of Delaware No Drawing. Application June 25, 1953,
Serial No. 364,201

4 Claims. (Cl. 260—19)

The present invention relates to improved oleoresinous coating compositions prepared by esterifying p-t-butylphenol formaldehyde resins with mixtures of unsaturated fatty acids and dimerized rosins.

In the application of David Aelony, Serial No. 324,839, filed December 8, 1952, it has been proposed to esterify phenolic resins with mixtures of unsaturated fatty acids and dibasic acids such as the aliphatic dibasic acids containing from 4–10 carbon atoms. It has also been proposed to use rosin as part of the esterifying acid. It has now been found that certain advantages are attained by the use of a mixture of unsaturated fatty acids and dimerized rosin for esterification of the p-t-butylphenol formaldehyde resins. Some of the advantages obtained are as follows: The reaction mixtures are less complex because of the fewer reactants employed. Dimerized rosin shows little tendency to promote gelation during esterification. Dimerized rosin is relatively inexpensive as compared with the aliphatic dibasic acids containing from 4–10 carbon atoms. Dimerized rosin is relatively non-volatile and is not lost from the reaction mixture. Because of the fewer reactants employed, control of the reaction is simpler and likewise the processing and recovery of unreacted raw materials is simplified.

It is, therefore, an object of the present invention to provide a novel oleoresinous coating composition comprising mixed esters of p-t-butylphenol formaldehyde resins with unsaturated higher fatty acids and dimerized rosin.

The resins employed in the present invention are derived from p-t-butylphenol and formaldehyde. On an average they contain from 4 to about 15 phenolic groups in the resin molecule. The resins are preferably prepared by the acid catalyzed condensation of p-t-butylphenol and formaldehyde. Suitable acid catalysts include oxalic acid, hydrochloric acid and the like. The resinification reaction may be carried out at atmospheric pressure or under superatmospheric pressure. The time required for condensation varies with the temperature and with the amount and type of catalyst. Resins may be made by carrying out the condensation for from ½–7 hours at 160° C. in the presence of oxalic acid. Where a strong catalyst such as HCl is employed, a suitable degree of condensation may be obtained in a shorter period of time, and at a lower temperature. A preferred method of forming these resins involves the reaction of the materials at about 160° C. under pressure. When the reaction is carried out to the extent desired the volatile materials including water as well as any unreacted p-t-butylphenol may be vaporized by merely venting the pressure reaction vessel to the atmosphere. The rapid release of pressure results in a puffing or expanding of the resin which presents the resin in a desirable form for further processing.

Where the resin is prepared by conventional atmospheric pressure reaction, it is desirable to remove volatile materials including water and unreacted p-t-butylphenol by any suitable method such as by vaporizing this material under a vacuum. For the present invention, however, it is not essential that all of these volatile materials be removed. One of the advantages of the present invention is that the esters prepared from resins containing some unreacted starting materials are still suitable.

In general, the resins obtained are brittle resins of light color. They are insoluble in fatty oils and fatty acids. The resins most suitable for the present invention have a viscosity ranging from approximately 4 to about 20 centistokes in a 30% solution by weight in dimethyl formamide. This viscosity is determined as follows. A filtered 30% solution by weight of the resin in dimethyl formamide is tested in the Ostwald-Fenske S300 viscosimeter at 30° C. using 10 cc. of solution. The time thus obtained is compared with the time and viscosity of a National Bureau of Standards' standard sample oil K5 to determine the viscosity of the 30% solution of the resin in accordance with the formula $$\text{Viscosity in centistokes} = \frac{t_x}{d_s t_s} \cdot \eta_s \cdot 100$$

where:

$t_x$=time of efflux for polymer solution
$d_s$=density of standard
$t_s$=time of efflux of standard
$\eta_s$=absolute viscosity of standard, in poises The time of efflux varied from 21–74 seconds with the viscosimeter employed.

The resins above described are esterified with a mixture of unsaturated higher fatty acids containing from 8–22 carbon atoms and dimerized rosin. The fatty acids employed may be single, isolated fatty acids or mixtures of fatty acids derived from a drying or a semi-drying oil or any selected fraction of the mixed acids of a drying or a semi-drying oil, particularly the more highly unsaturated fraction of such mixed acids. Particularly useful are the semi-drying oils such as soybean oil, cottonseed oil, and corn oil. The acids employed for esterification should have an iodine value of from 100–160.

The dimerized rosin is a dibasic acid obtained by polymerizing rosin. Suitable materials of this type are on sale under the trade names Dymerex and Dimer 120 which are sold by Hercules Powder Company and Newport Industries respectively.

The mixed acids employed for esterification should esterify at least 50% of the total hydroxyl content of the phenolic resin. The range of esterification may run from 50–100%, the preferred range being from 70–100%. More than the theoretical amount of acids may be employed during esterification in order to speed up the reaction and the excess later removed by extraction or distillation. Usually there is little advantage in using more than 25% excess acid.

The ratio of fatty acids to dimerized rosin in the esterifying acids may be carried within wide limits, depending on the properties desired in the resin ester. High ratios of dimerized rosin lead to increased film hardness, faster drying and usually to improved alkali-resistance. Unduly high ratios of dimerized rosin tend to produce products of reduced flexibility and durability. It is preferred, therefore, that the dimerized rosin be used at a molecular equivalent value in the range of 15–30% of the total esterifying acid, although valuable products are obtained within the range of 10–50%.

The esterification may be carried out by simply heating the resins with the mixed acids at temperatures within the approximate range of 200–275° C. Esterification catalysts in general may be employed, but it is preferred to employ triphenyl phosphite or other phosphite esters as the esterification catalyst. The time required for esterification varies widely depending upon the conditions.

Approximately 4–8 hours is usually required for virtually complete esterification at 260° C. using the azeotropic method. Reaction temperature, catalyst concentration and reactant ratios also exert a material effect on the time required for the desired degree of esterification.

Esterification may be conducted by the fusion method, the azeotropic method or other appropriate methods. In the azeotropic method, carriers other than xylol for removing water may be employed. Esterification may be conducted at atmospheric pressure or at higher or lower pressure.

Following esterification it is usually desirable to remove volatile materials by subjecting the reaction mixture to a vacuum at an elevated temperature. The extent of removal of volatile material, however, is not critical in the present invention.

The esters obtained are valuable for the formulation of varnishes, pigmented air-dry and baking enamels, for can and drum linings, insulating varnish, pigmented air-dry and baking primers, masonry paints, wall paints and the like.

*Example*

The reaction mixture consisted of 162 g. (1 equivalent) of a p-t-butylphenol formaldehyde resin having a viscosity of 6.66 centistokes (determined by the method described herein), 268 g. (.95 equivalent) of a highly unsaturated fraction of soybean oil acids, 112 g. (.30 equivalent) of a dimerized rosin, 4 g. of triphenyl phosphite catalyst and 50 ml. of commercial xylol. The mixture was heated to reflux under a Stark and Dean tube and held at 260° C. for approximately 6 hours. About 17.5 ml. of water was collected during this period. Then vacuum was gradually applied to the system at 260° C. to remove the xylol and other volatile materials including the 25% excess of fatty acids. Vacuum was first applied by water aspirator and then by HyVac oil pump to the full limit of the pump. The reaction product was a viscous amber-colored liquid having an acid number of 14.5 and a hydroxyl number of 23.8, indicating virtually complete esterification.

A sample of this product was diluted to 50% solids with mineral spirits and soluble driers were added at a concentration of 0.3% lead and 0.06% cobalt (as naphthenates). The viscosity on the Gardner-Holdt scale was A and the color by Gardner (1933 standards) was 9–10. Coatings were applied to glass plates with a 1.5 mil blade and to inverted test tubes by dipping. The product dried to the no-transfer stage in 85 minutes, dried to a very slight tack in 145 minutes, and was tack-free to foil in 4 hours.

After one day of drying, the coating had a hardness value of 34 as determined by the Sward Rocker method; and after four days the value was 40. The resistance to 5% aqueous sodium hydroxide at 25° C. was found to be at least 336 hours.

A baking metal primer was prepared by grinding the following ingredients overnight in a ball mill.

Formula:

| | Parts by weight |
|---|---|
| Titanium oxide | 150 |
| Lithopone | 150 |
| Zinc oxide | 50 |
| Lecithin | 4 |
| Phenolic resin ester | 385 |
| Mineral spirits | 255 |
| 6% manganese naphthenate | 3 |

Films of the primer were applied to bonderized steel panels by spraying. The films were baked at 400° F. for 20 minutes. They were tested for resistance to detergents, simulating conditions found in washing machines for home laundry use by immersing the panels in a 1% solution of a commercial home detergent, held at a temperature of 165° F. After 560 hours of immersion the coating was found to be in better condition than a similar coating of a high grade commercial primer tested in the same manner.

I claim as my invention:

1. A p-t-butylphenol formaldehyde resin esterified with a mixture of an unsaturated higher fatty acid and dimerized rosin, the resin being esterified at least 50% and the dimerized rosin constituting from 10–50 equivalent percent of the acids esterified.

2. A p-t-butylphenol formaldehyde resin esterified with a mixture of an unsaturated higher fatty acid and dimerized rosin, the resin being esterified at least 50% and the dimerized rosin constituting from 15–30 equivalent percent of the acids esterified.

3. A p-t-butylphenol formaldehyde resin esterified with a mixture of an unsaturated higher fatty acid and dimerized rosin, the resin being esterified at least 70% and the dimerized rosin constituting from 10–50 equivalent percent of the acids esterified.

4. A p-t-butylphenol formaldehyde resin esterified with a mixture of an unsaturated higher fatty acid and dimerized rosin, the resin being esterified at least 70% and the dimerized rosin constituting from 10–50 equivalent percent of the acids esterified, the product being substantially free from materials vaporizable at 260° C. under a high vacuum.

References Cited in the file of this patent

UNITED STATES PATENTS

| 2,622,071 | Harrison | Dec. 16, 1952 |
| 2,638,458 | Wheeler | May 12, 1953 |

OTHER REFERENCES

Paint Manufacture, July 1943, pages 161 and 162.